No. 719,924. PATENTED FEB. 3, 1903.
B. F. WESTCOTT.
MEASURING INSTRUMENT.
APPLICATION FILED JULY 27, 1901.
NO MODEL.

WITNESSES:

INVENTOR
Benjamin F. Westcott
BY James R. Rogers
ATTORNEY.

UNITED STATES PATENT OFFICE.

BENJAMIN F. WESTCOTT, OF BALTIMORE, MARYLAND.

MEASURING INSTRUMENT.

SPECIFICATION forming part of Letters Patent No. 719,924, dated February 3, 1903.

Application filed July 27, 1901. Serial No. 69,940. (No model.)

*To all whom it may concern:*

Be it known that I, BENJAMIN F. WESTCOTT, a citizen of the United States, residing at Baltimore, in the State of Maryland, have invented certain new and useful Improvements in Measuring Instruments; and I do hereby declare the following to be a full, clear, and exact description of the invention, such as will enable others skilled in the art to which it appertains to make and use the same.

My invention relates to improvements in measuring instruments for accurately determining the dimensions of persons desirous of having their garments stylishly and accurately fitted; and some of the objects of my improvements are, first, to provide a measuring instrument by means of which the true and natural configuration of the bust or body is ascertained; second, to construct a measuring tool or instrument whereby from the measurements of the person the usual and natural form of the body of the person measured is definitely determined; third, to make a measuring device for obtaining the definite dimensions of the body of the person desired to be fitted with clothing, so that the natural attitude of the person is obtained; fourth, to produce a measuring instrument for precisely indicating the dimension of the bodies of persons, so that the cutter or fitter can definitely deduce the natural and accustomed carriage of the person to be fitted; fifth, to produce a measuring instrument by means of which the measurements of bodies of persons are made and from which measurements the natural usual accustomed style, carriage, figure, and attitude of the person measured can be accurately obtained; sixth, to afford persons measured to have neatly-fitted waists and other garments afterward made for them; seventh, to facilitate persons traveling when once measured to obtain accurately-fitting waists or other garments shipped to them at points distant from that where measured; eighth, to avoid loss of time in recutting and refitting garments and the consequent saving of money to the employer and customer. I attain these objects by the construction illustrated in the accompanying drawings, in which—

Figure 1:
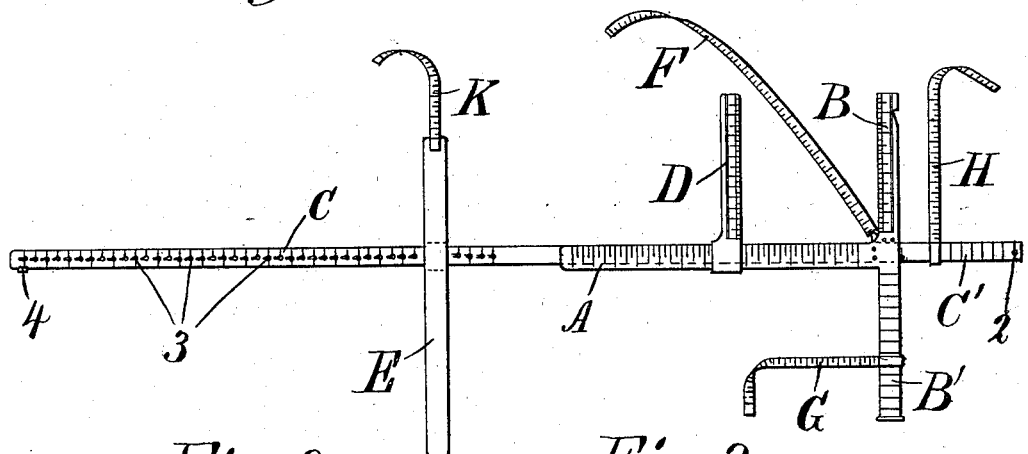
Figure 2:
Figure 3:
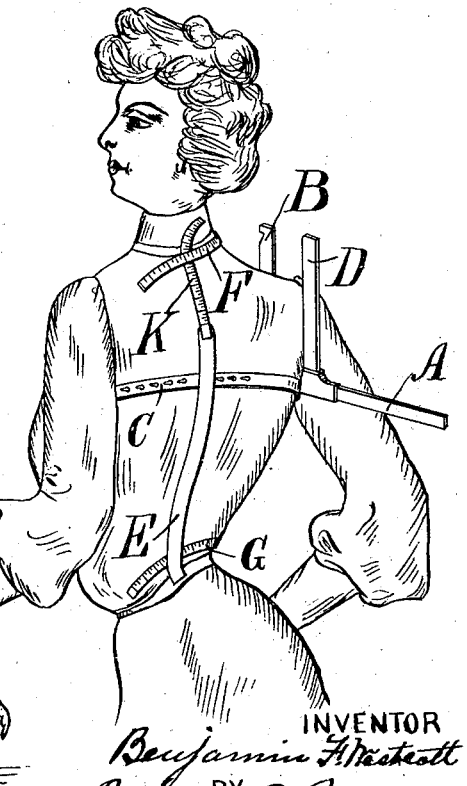

Figure 1 is a view in elevation, showing my improved measuring instrument, part in full and part in dotted lines. Fig. 2 is a partial front view of the figure of a person being measured, the instrument being applied thereto, part of the instrument shown in full lines and parts thereof shown in dotted lines; and Fig. 3 is a partial back view of the figure of a person being measured, my instrument applied, parts of which are shown in full lines and parts thereof in dotted lines.

Similar characters show like parts throughout the several views.

The letter A represents the horizontal measuring-rod. The letters B and B' refer to the vertical measuring-rod, fixed and rigidly held at right angles to the measuring-rod A at or near one end thereof, and it is graduated in like manner as the measuring-rod A.

I securely attach the flexible ruler C C' to the measuring-rods A and B B' at a point where the two said rods intersect or cross each other by means of headed rivets, screws, or like fastening devices.

D indicates the sliding measuring-rod, secured movably upon the measuring-rod A, and it is graduated in inches, half and quarter inches, as are the two horizontal and vertical rods A B B', and the flexible ruler C C' is in like manner graduated.

The letter E refers to the curved spring-band secured to the ruler C C' at right angles thereto, a portion thereof projecting on both sides of the said ruler C C' and longitudinally movable thereon, and the said spring-band E is adapted to hold the horizontal flexible ruler C C' in place around the bust of the person while being measured, preventing the rear portion of the said ruler C C' from slipping downward during the measuring operation, as shown upon Fig. 3 of the drawings. To the upper projecting end of the said spring-band E, I fasten the graduated measuring-tape K for the purpose of measuring the rear part of the shoulders and back, as will obviously appear upon inspecting Fig. 3 of the drawings.

That portion of the measuring-rod B B' below the horizontal measuring-rod A and below the measuring-ruler C C', I designate by the reference-letter B', and the opposite end or portion of said vertical measuring-rod I indicate by the letter B, and the shorter end of the ruler C C', or that portion of the said ruler projecting from the point of attachment of the said ruler to the horizontal and vertical rod A B B', I indicate by the letter C', and the other opposite and longer portion of the said ruler C C', I denominate by the reference-letter C.

To the portion B' of the vertical measuring-rod B B', I movably secure the sliding graduated measuring-tape G in order to determine the dimensions of the body of the person upon which it is applied, as illustrated upon Fig. 3 of the drawings.

In the angle formed by the juncture of the horizontal measuring-rod A and the vertical measuring-rod B B', I pivotally secure one end of the measuring-tape F, designed to give the measurement of that portion of the body to which it is applied, as shown in Figs. 2 and 3 of the drawings. The graduated measuring-tape H is adjustably attached to the shorter arms or portions C' of the flexible ruler C C' and is used to determine the distance from the center of the bust in front to the collar-line of the waist or garment to be measured.

The shorter arm or portion C' of the ruler has secured upon its free end, upon one face thereof, a projecting stud 2, adapted to be inserted into one of the holes 3 upon the opposite end of the flexible ruler C C', according to the size of the bust of the person measured. To the longer arm or portion C of the flexible ruler I secure the horizontal upturned bracket 4, made integral with said larger arm or secured thereto in any suitable manner, as by rivet or solder. Upon and into the said bracket the shorter arm C' of the flexible ruler rests when adjusted upon the bust of the person measured, thereby keeping the free ends of the ruler in alinement and parallel with each other.

The downward-projecting portion of the vertical rod (designated by the reference-letter B') located below the horizontal rod A and the flexible ruler C C' is made of metal and is attached to the upper portion of said vertical rod B by means of headed rivets, screws, or like fastening devices.

What I claim as my invention, and desire to secure by Letters Patent, is—

1. In a measuring instrument, a horizontal measuring-rod, vertical measuring-rods, one extending above and the other below the said horizontal rod, a flexible graduated ruler, having a stud in one of its free ends, and provided with a bracket, and holes in the opposite free end thereof, sliding measuring-tapes adjustably secured upon the said vertical rod, and upon the ruler, and a measuring-tape pivotally fixed at the juncture of the horizontal and vertical rods.

2. The horizontal, vertical and sliding rods, a graduated flexible ruler, provided at or near one of its free ends with a fixed stud and having perforations in the opposite free end thereof, a sliding curved spring-band movably secured upon the said ruler and having a measuring-tape secured to the said band.

3. The horizontal and fixed vertical rods, the vertical rod projecting above and below the horizontal rod, the said vertical rod having a sliding measuring-tape thereon, the flexible measuring-ruler having an adjustable measuring-tape secured thereto and the curved adjustable spring-band movably secured to the said ruler and provided with a measuring-tape fastened thereon.

4. The horizontal measuring-rod, the vertical measuring-rod, the lower portion of said vertical rod being flexible, and attached to the upper portion of said vertical rod and to the said horizontal rod, the said flexible rod provided with an adjustable measuring-tape, and the flexible horizontal ruler having a sliding spring-band secured thereon.

In testimony whereof I have hereunto affixed my signature in presence of two witnesses.

BENJAMIN F. WESTCOTT.

Witnesses:
V. BOND MAUPIN,
JAMES W. BOWERS, Jr.